United States Patent [19]
Asama et al.

[11] Patent Number: 5,469,005
[45] Date of Patent: Nov. 21, 1995

[54] BRUSHLESS MOTOR

[75] Inventors: Kiichi Asama; Hiroo Ashibe, both of Komagane, Japan

[73] Assignee: Sankyo Seiki Mfg. Co., Ltd., Nagano, Japan

[21] Appl. No.: 227,114

[22] Filed: Apr. 13, 1994

[30] Foreign Application Priority Data

Apr. 16, 1993 [JP] Japan ..................... 5-025259

[51] Int. Cl.⁶ ............................. H02K 11/00; H02K 1/14
[52] U.S. Cl. ............................. 310/68 B; 310/254
[58] Field of Search ............... 310/67 R, 68 B, 310/193, 254, DIG. 3, DIG. 6; 360/98.07, 99.04, 99.08

[56] References Cited

U.S. PATENT DOCUMENTS 5,194,771  3/1993  Otsuki et al. ................ 310/68 B

FOREIGN PATENT DOCUMENTS 570231  11/1993  European Pat. Off. ........... 310/254
4-289759  10/1992  Japan ..................... 310/254

*Primary Examiner*—Clayton E. LaBalle
*Attorney, Agent, or Firm*—McAulay Fisher Nissen Goldberg & Kiel

[57] ABSTRACT

A brushless motor comprises a rotor, a driving magnet which is rotated integrally with the rotor and a stator core disposed so as to oppose the driving magnet and being wound therearound with a coil. The stator core has salient poles with umbrella portions except for notched portions thereof. A magnetic sensor is disposed in the vicinity of the stator core in a first notched portion prepared by partly removing two corresponding adjacent salient-pole umbrella portions of the stator core for detecting a magnetic pole of the driving magnet. A second notched portion is formed by partly removing two corresponding adjacent salient-pole umbrella portions in a zone of the whole circumferential area of the stator core. The second notched portion is magnetically balanced with the first notched portion.

4 Claims, 6 Drawing Sheets

BRUSHLESS MOTOR

BACKGROUND OF THE INVENTION a) Field of the Invention

The present invention relates to a brushless motor having a stator core and, more particularly, to a brushless motor in which the balance between the driving magnet and the stator core in terms of the magnetic attraction force is improved.

b) Background Art

A brushless motor having a structure shown in FIG. 8 is known as a conventional peripherally opposed type brushless motor having a stator core. Referring to FIG. 8, a stator core 48 having a number of radially extending salient poles is fixed onto a substrate 10. Each salient pole has a salient-pole umbrella portion 49 at its tip end, each salient pole being wound therearound with a driving coil 50. The driving coils 50 have a three-phrase structure. The stator core 48 of the illustrated example originally has twenty four salient poles, three of which are, however, removed on an every-other basis. Between two adjacent salient-pole umbrella portions 49 having one removed salient pole therebetween, there are formed open slots B1, B2, and B3; the dimension or width of each of which is larger than the gap between the salient-pole umbrella portions 49 which are originally provided. Magnetic sensors H1, H2, and H3, each consisting of a Hall element and the like, are disposed in the open slots B1, B2, and B3, respectively.

A flat-cup shaped rotor, not shown, is rotatably supported so as to cover the stator core 48 from above the same. On an inner peripheral surface of this rotor, a driving magnet is integrally mounted, and the salient-pole umbrella portions 49 are disposed opposing the driving magnet so that tip end faces thereof may be located with respect to an inner peripheral surface of the driving magnet at a suitable interval therebetween. As is well known, the above-mentioned three magnetic sensors H1, H2 and H3 detect the magnetic poles of the driving magnet and switch the energization of the driving coils 50 of which they are in charge, thereby driving the rotor to rotate.

PROBLEMS ADDRESSED BY THE INVENTION

In a brushless motor having a stator core, the magnetic sensors are likely to receive the magnetic noises from the stator core. When the magnetic sensor detects such magnetic noises, the switching timing for the energization of the corresponding phase driving coils becomes out of sequence, which causes an increase in the torque ripple. As a countermeasure against this, in the above-mentioned conventional example shown in FIG. 8, the salient poles are partly removed to form the larger open slots B1, B2, and B3 in which the magnetic sensors H1, H2, and H3 are disposed, so as to prevent these sensors from detecting the magnetic noises from the stator core 48.

However, in the above-mentioned conventional example, although an increase in torque ripple due to the magnetic noises can be prevented, since the salient poles are partly removed, the balance is disturbed between the driving magnet and the stator core in terms of the magnetic attraction force during a full-circumference rotation of the rotor. As a result, the rotation of the rotor becomes unbalanced which gives rise to a problem that the wow/flutter characteristic, which is an important one for the motor, is deteriorated. Particularly when, as in recent floppy-disk driving motors for example, the rotor has a tendency to become small in size and thickness because of demand for such reduction, the inertial force of the rotor becomes small with the result that the above-mentioned imbalance in magnetic attraction force greatly affects the wow/flutter characteristic. Therefore, this proposed countermeasure is not deemed satisfactory.

OBJECT AND SUMMARY OF THE INVENTION

The present invention has been made in order to solve the above-mentioned problems inherent in the conventional technology and the primary object of the present invention is to provide a brushless motor which can be improved in wow/flutter characteristic by balancing the magnetic attraction force between the driving magnet and the stator core through the contrivance of the configuration of the salient-pole umbrella portions of the stator core and the resulting decrease in torque ripple.

In accordance with the invention, a brushless motor comprises a rotor, a driving magnet which is rotated integrally with the rotor and a stator core disposed so as to oppose the driving magnet and being wound therearound with a coil. The stator core has salient poles with umbrella portions except for notched portions thereof. A magnetic sensor is disposed in the vicinity of the stator core in a first notched portion prepared by partly removing two corresponding adjacent salient-pole umbrella portions of the stator core for detecting a magnetic pole of the driving magnet. A second notched portion is formed by partly removing two corresponding adjacent salient-pole umbrella portions in a zone of the whole circumferential area of the stator core. The second notched portion is magnetically balanced with the first notched portion.

A brushless motor according to an embodiment of the present invention will now be described with reference to the drawings. Note that common reference numerals are used to denote constituent portions corresponding to those of a conventional brushless motor shown in FIG. 8.

DESCRIPTION OF THE PREFERRED EMBODIMENTS

Figure 1:
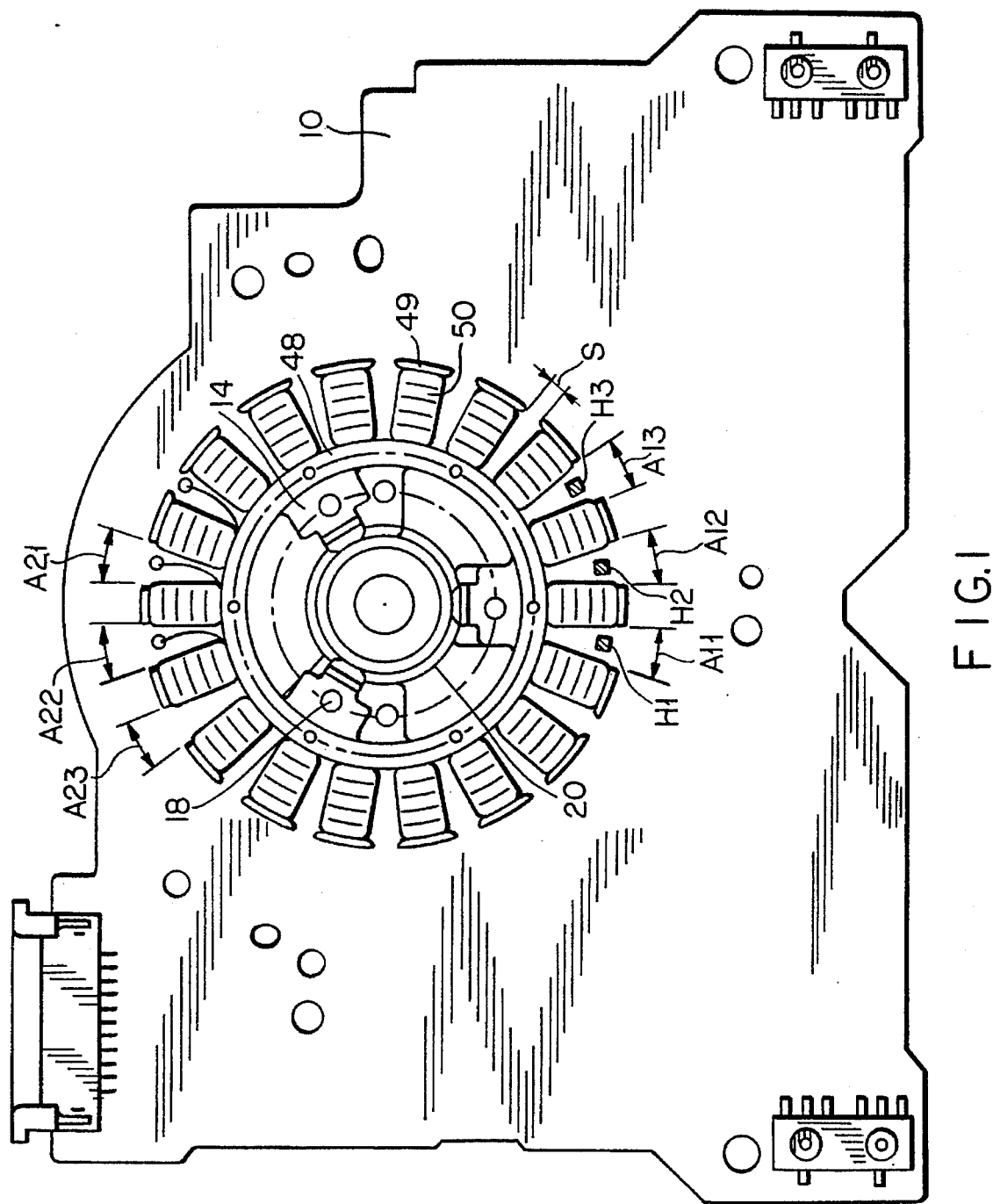
FIG. 1 is a plan view showing an essential portion of a brushless motor according to an embodiment of the present invention.
Figure 2:
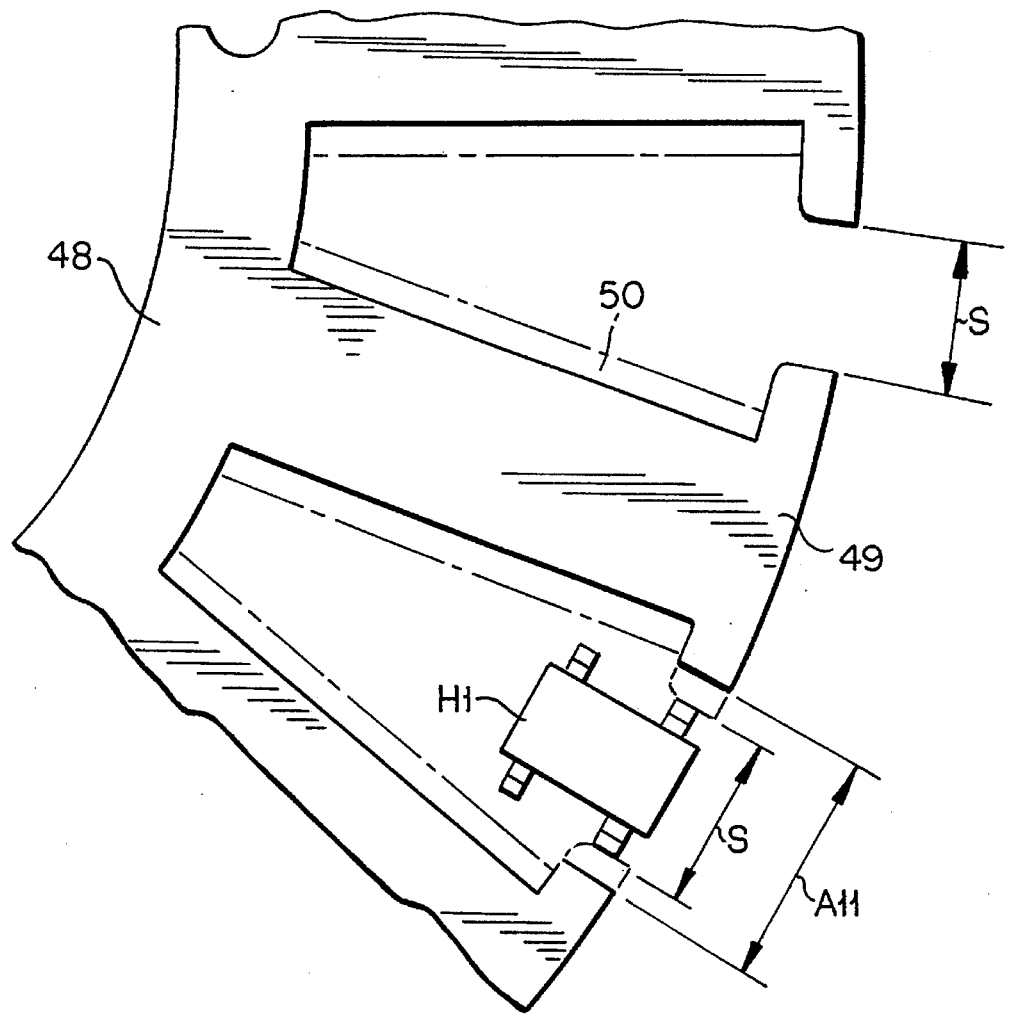
FIG. 2 is an plan view showing salient pole portions according to the embodiment of the present invention.
Figure 3:
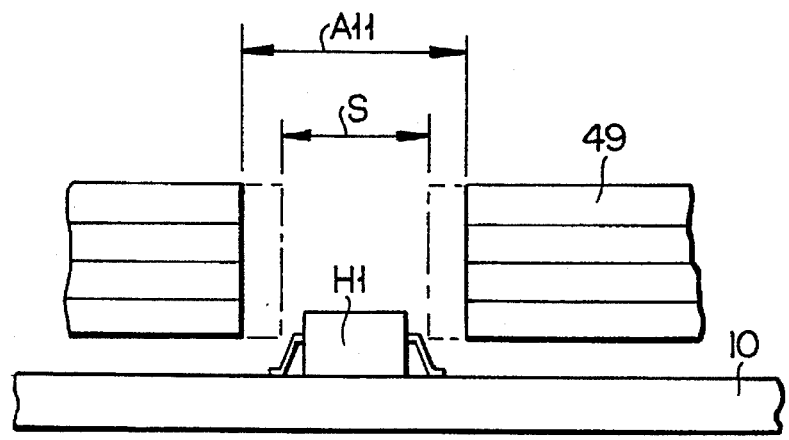
FIG. 3 is a front view showing the salient pole portion according to the embodiment of the present invention.

Referring to FIG. 1, the stator core 48 has eighteen, radially extending, salient poles, each of which is wound therearound with a driving coil 50. The tip end of the salient pole is in the form of a salient-pole umbrella 49 spreading in the circumferential direction. As shown in FIGS. 2 and 3 as well, when the original spacing or width of an open slot between two adjacent salient-pole umbrella portions 49 is represented by S, the width of the open slot between particular two adjacent salient-pole umbrella portions 49 is made larger than S. Namely, a part of each peripherally or circumferentially extending portion of such particular salient-pole umbrella is cut away to such an extent as to enable the protection of a winding of the driving coil 50 and the prevention of the winding deformation without hindrance. In the example shown in FIG. 1, portions of the salient-pole umbrella portions 49 facing three consecutive open slots are cut away to provide first notched portions A11, A12, and A13, the dimension of which is larger than the original spacing S. Further, the salient-pole umbrella portions 49 at a zone in which the magnetic balance is established with those first notched portions A11, A12 and A13, i.e., at a zone arranged at a mechanical angle of 180° from the notched portions A11, A12 and A13, are cut away to provide second notched portions A21, A22, and A23. Disposed on the substrate 10 are magnetic sensors H1, H2, and H3, each consisting of a Hall element and the like, at the positions of the first notched portions A11, A12, and A13, respectively.

The driving coils 50 have a three-phase structure. The above-mentioned magnetic sensor H1, H2, and H3 are sensors for switching the energization of the corresponding driving coils 50. Namely, the three sensors H1, H2, and H3 detect the magnetic poles of the above-mentioned driving magnet 44 and switch the energization of the driving coils 50 of which they are in charge, thereby energizing the driving magnet 44 and continuously driving the rotor 42 to rotate.

According to the above-described embodiment, since the magnetic sensors H1, H2, and H3 are disposed at the positions of the first notched portions A11, A12, and A13 prepared by partly cutting away the salient-pole umbrella portions 49 of the stator core 48, those sensors H1, H2, and H3 are located away from the stator core 48. Therefore, the sensors receive no magnetic noise from the stator core 48. Accordingly, the switching timing for the energization of the driving coils 50 is chosen with a high accuracy, enabling an increase in torque ripple to be prevented. Further, in the above-mentioned embodiment, in addition to the first notched portions A11, A12, and A13 formed in the stator core 48, the second notched portions A21, A22, and A23 are formed at the zone thereof where they are magnetically balanced with the first notched portions A11, A12, and A13. As a result, the balance of rotation of the rotor 42 is improved with the result that the wow/flutter characteristic is improved.

Figure 4:
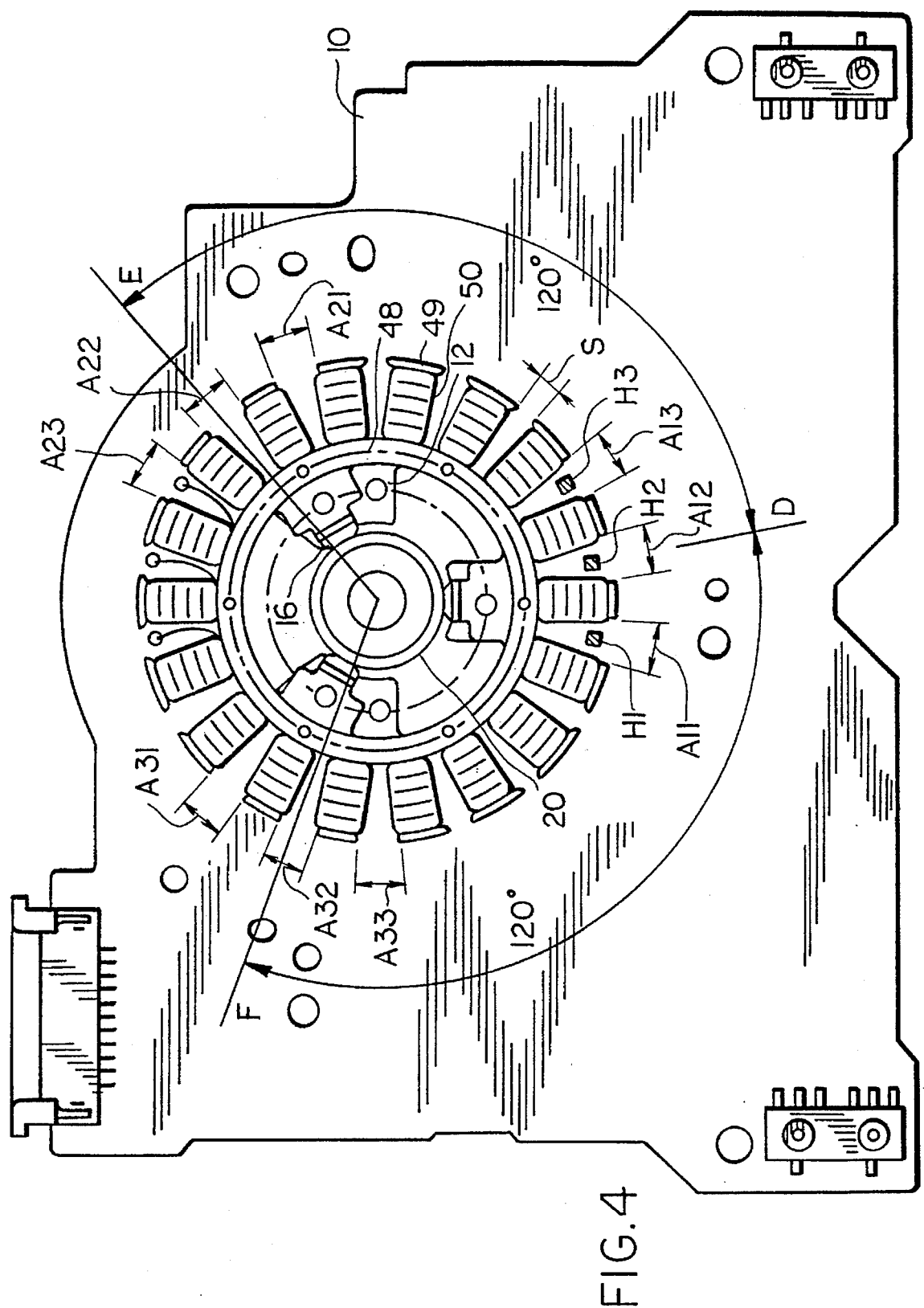
FIG. 4 is a plan view showing an essential portion of the brushless motor according to another embodiment of the present invention.

In a case where the number of salient poles of the stator core is eighteen as in the above embodiment, the zone permitting another group of notched portions to be magnetically balanced with the first notched portions is not limited to the zone arranged 180° from the same. For example, as shown in FIG. 4, when the first notched portions A11, A12, and A13 are formed by partly cutting away the salient-pole umbrella portions 49 facing the three consecutive open slots, and the magnetic sensors H1, H2, and H3 are disposed therein, the second notched portions A21, A22, and A23, and A31, A32, and A33 may be respectively formed at two zones, each arranged 120° from the first notched portions A11, A12, and A13. The remaining construction is the same as that in the preceding embodiment. This second embodiment has similar effects to those attainable with the preceding embodiment.

Figure 5:
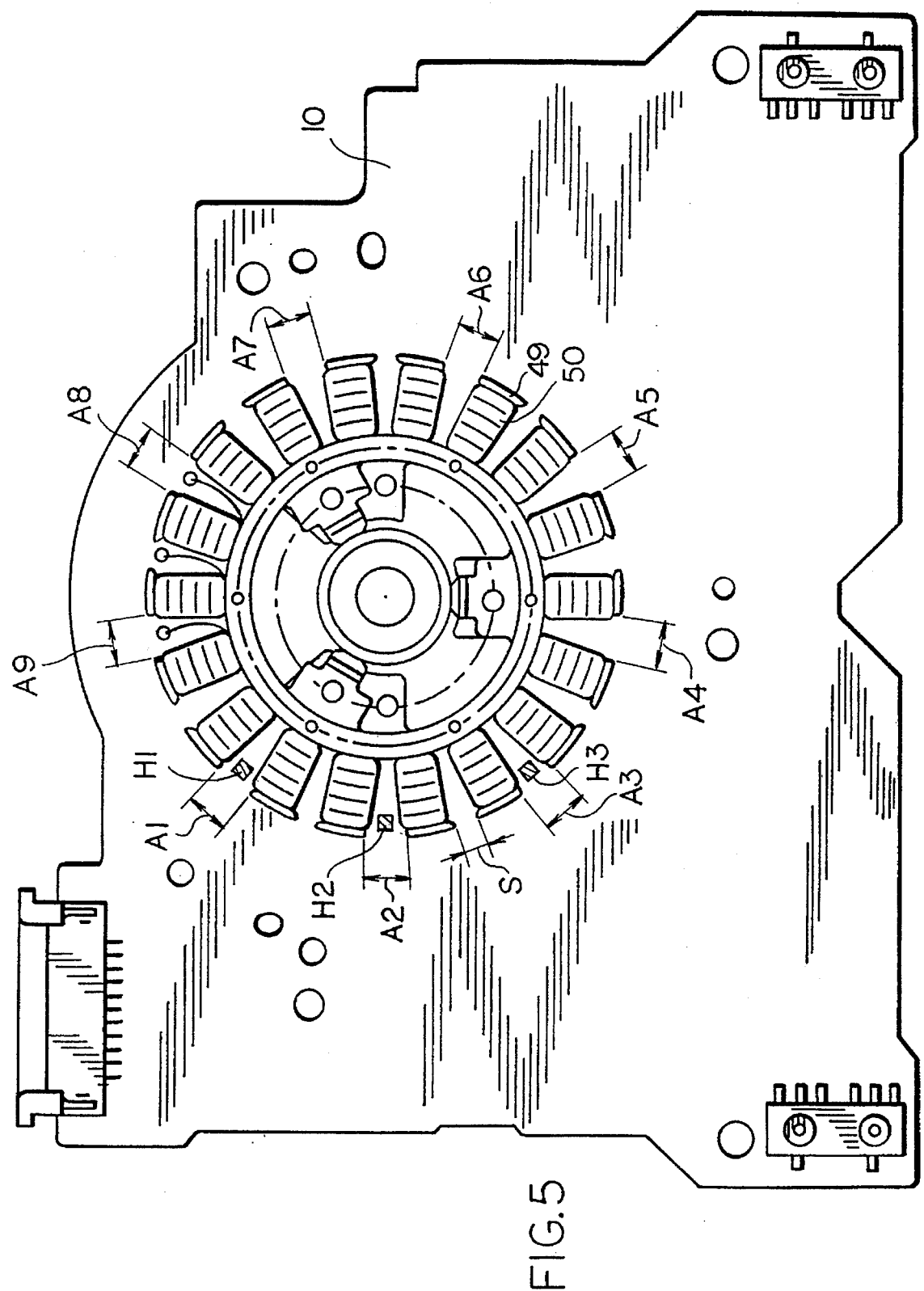
FIG. 5 is a plan view showing an essential portion of the brushless motor according to still another embodiment of the present invention.

Further, in a case where the number of salient poles of the stator core is eighteen, as shown in FIG. 5, the notched portion being prepared by partly cutting away the salient-pole umbrella portions 49 may be formed at every second open slot existing between the adjacent two salient poles.

When it is now assumed that the notched portions sequentially formed in the circumferential direction are represented by A1, A2, A3, A4, A5, A6, A7, A8, and A9, three of them A1, A2, and A3 are taken to be the first notched portions, in which the magnetic sensors H1, H2, and H3 are disposed. The remaining notched portions A4 to A9 are taken to be the second notched portions. The remaining construction is the same as that in the above-mentioned preceding embodiment. This third embodiment has similar effects to those attainable with the preceding embodiment.

Figure 6B:
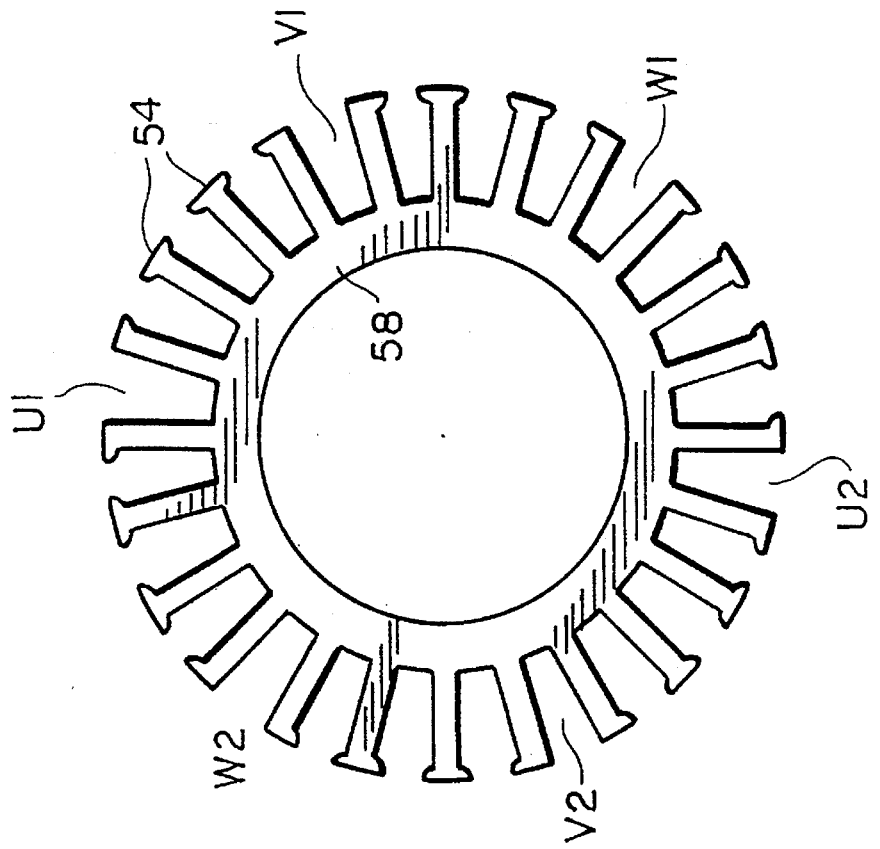
FIGS. 6(a) and 6(b) are a plan views showing a modification of a stator core which is applicable to the present invention.
Figure 6A:
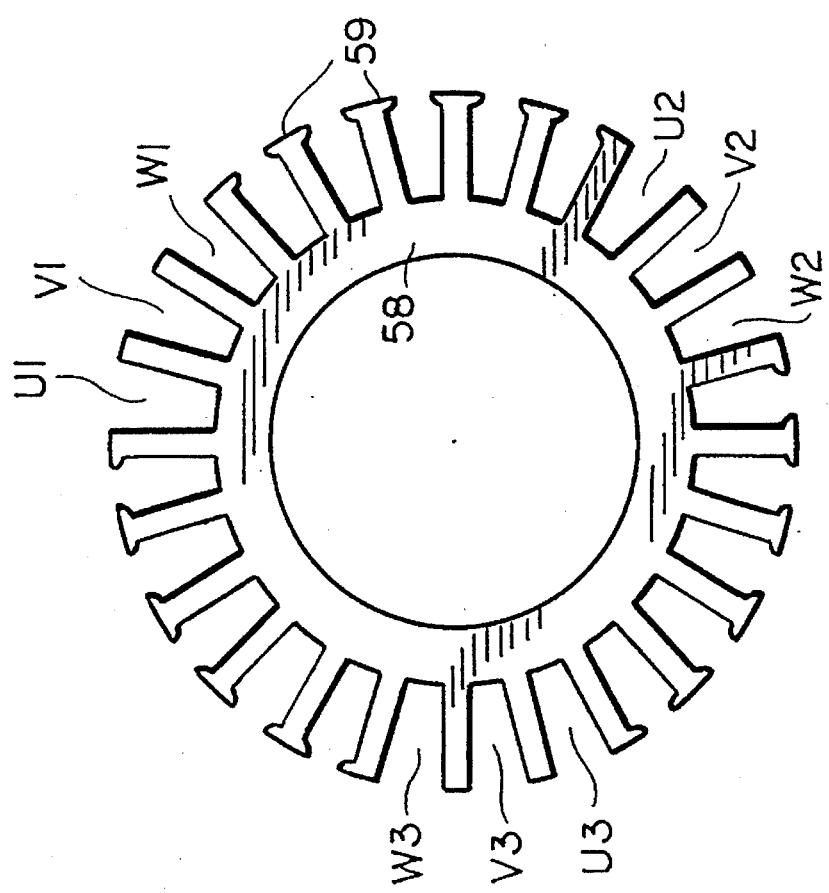

Even if the number of salient poles of the stator core is changed, it is possible to apply the principles of the present invention. In the examples shown in FIGS. 6 and 7, the number of salient poles is twenty four. In the example of FIG. 6(*a*), the salient-pole umbrella portions 59 facing three consecutive open slots of the stator core 58 are partly cut away to provided notched portions U1, V1, and W1. Two groups of notched portions U2, V2, and W2, and U3, V3, and W3 are formed at zones each arranged 120° from those notched portions U1, V1, and W, respectively. One group, arbitrarily chosen, is taken to be the first group of notched portions in which the magnetic sensors are disposed, the remaining groups of notched portions being taken to be the second notched portions.

In the example shown in FIG. 6(*b*), the salient-pole umbrella portions 59 facing away every fourth open slot are partly cut away, whereby the notched portions U1, V1, and W1, and U2, V2, and W2 are formed an angular intervals at 60°. If the notched portions U1, V1, and W1 are taken as the first notched portions and the magnetic sensors are disposed therein, each of the second notched portions U2, V2, and W1 is located at a position arranged 180° from a corresponding one of the first notched portions U1, V1, and W1.

Figure 7:
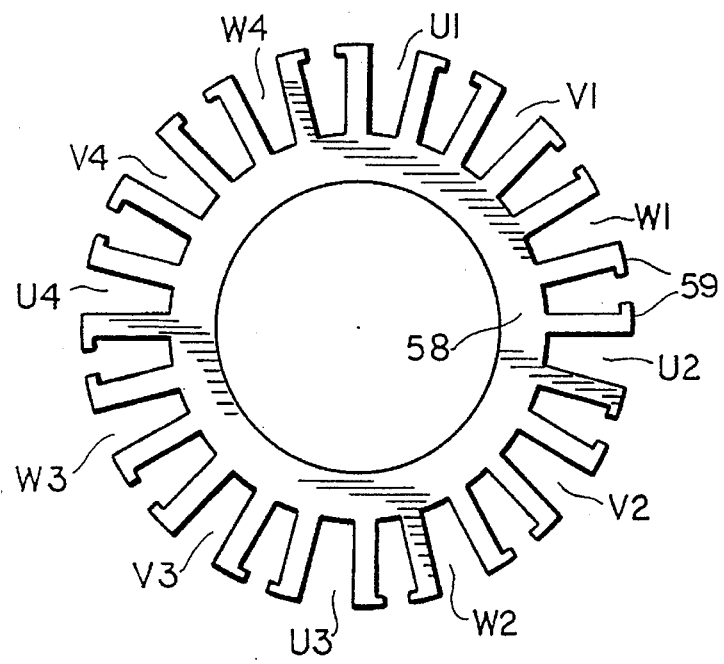
FIG. 7 is a plan view showing another modification of a stator core which is applicable to the present invention.
Figure 8:
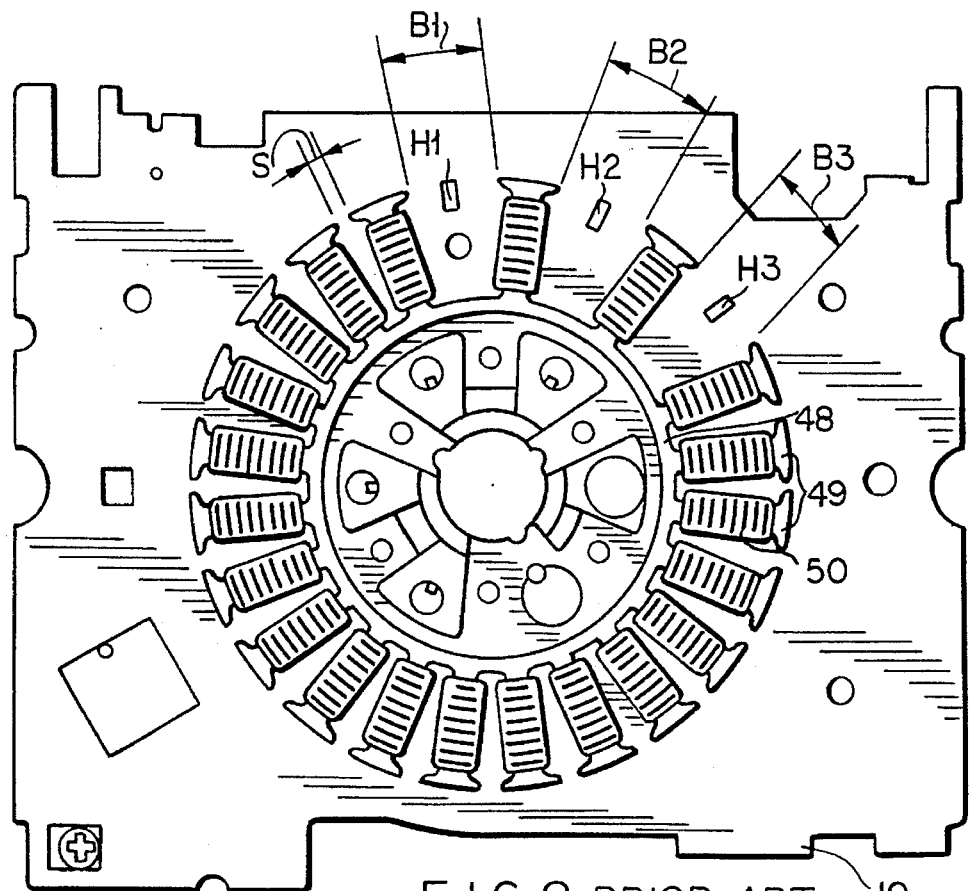
FIG. 8 is a plan view showing an essential portion of a conventional brushless motor.

In the example shown in FIG. 7, the notched portion prepared by partly cutting away opposing umbrella portions of the corresponding adjacent salient-pole umbrella portions 59 is provided with respect to every second open slot existing between the adjacent two salient poles. If the notched portions thus obtained are represented by U1-V1-W1, U2-V2-W2, U3-V3-W3, U4-V4-W4 and the notched portions U1-V1-W1 are taken as the first notched portions in which the magnetic sensors are disposed, then the remaining notched portions U2-V2-W2, U3-V3-W3, U4-V4-W4 will be the second notched portions.

Note that if the brushless motor is of a three-phase structure, the disposition relationship of the notched portions according to the present invention may include various other disposition relationships than those explained above according to the present invention may include various other disposition relationships than those explained above according to the number of the salient poles. Namely, if the number of salient poles of the notched is 3 m≧6 (n is an integer which is not less than 1), the notched portion prepared by partly cutting away the salient-pole umbrella portions of the stator core is provided with respect to every second open slot existing between the adjacent two salient poles. The magnetic sensors are disposed in the above-mentioned notched portions.

The following table shows the possibility that, in the case of three-phase structure, the notched-portion disposition may be established according to the number of salient poles.

| m | 3m | 180° symmetrical disposition | 120° three equiangular disposition | every second disposition |
|---|---|---|---|---|
| 1 | 3 | x odd number | x A>S not established | x A>S not established |
| 2 | 6 | x A>S not established | o | o (6 × 1) |
| 3 | 9 | x | x A>S not established | x |
| 4 | 12 | o | o | o (6 × 2) |
| 5 | 15 | x | o | x |
| 6 | 18 | o | o | o (6 × 3) |
| 7 | 21 | x | o | x |
| 8 | 24 | o | o | o (6 × 4) |
| 9 | 27 | x | o | x |
| 10 | 30 | | o | o (6 × 5) |
| . | . | . | . | . |
| . | . | . | . | . |
| . | . | . | . | . |
| n | 3n = even number | o | o | 3n = 6 × a  o |
|  | 3n = odd number | x | o | 3n ≠ 6 × a  x |

Note:
A represents the number of open slots where magnetic sensors are disposed.

B represents the number of open slots where no magnetic sensor is disposed.

The present invention can be applied not only to a floppy disk drive motor but also to motors for various use purposes.

According to the present invention, since the magnetic sensors are disposed in the first notched portions prepared by partly cutting away the salient-pole umbrella portions of the stator core, they are located remote from the stator core, so that they do not catch any magnetic noise from the stator core. The switching timing for the energization of the corresponding driving coils is chosen with a high accuracy, enabling an increase in torque ripple to be prevented. Further, since the first notched portions are not only provided in the stator core but the second notched portions are provided at a zone in which they are magnetically balanced with the first notched portions, the rotation balance of the rotor is bettered with the result that the wow/flutter characteristic can be improved.

While the foregoing description and drawings represent the preferred embodiments of the present invention, it will be obvious to those skilled in the art that various changes and modifications may be made therein without departing from the true spirit and scope of the present invention.

What is claimed is:

1. A brushless motor comprising:

a rotor;

a driving magnet which is rotated integrally with said rotor;

a stator core disposed so as to oppose said driving magnet and being wound therearound with a coil, said stator core having salient poles with umbrella portions except for notched portions thereof;

a magnetic sensor disposed in the vicinity of said stator core in a first notched portion prepared by partly removing two corresponding adjacent salient-pole umbrella portions of said stator core for detecting a magnetic pole of the driving magnet; and a second notched portion being formed by partly removing two corresponding adjacent salient-pole umbrella portions in a zone of the whole circumferential area of said stator core, said second notched portion being magnetically balanced with said first notched portion.

2. A brushless motor according to claim 1, wherein, when the number of salient poles of said stator core is 3 m≧12 (m is an integer which is not less than 4), said second notched portions are formed at a zone deviated 180° from the zone where said first notched portions are formed.

3. A brushless motor according to claim 1, wherein, when the number of salient poles of said stator core is 3 m≧6 (m is an integer which is not less than 2), said second notched portion is formed at two zones, each arranged 120° from the zone where the first notched portion is formed.

4. A brushless motor according to claim 1, wherein, when the number of salient poles of said stator core is 6 n≧6 (n is an integer which is not less than 1), a notched portion prepared by partly cutting away two corresponding adjacent salient-pole umbrella portions of said stator core is formed with respect to every second open slot existing between two corresponding adjacent salient poles, said magnetic sensor being disposed in said notched portion.

* * * * *